United States Patent
Xiao et al.

(10) Patent No.: US 12,363,784 B2
(45) Date of Patent: Jul. 15, 2025

(54) USER EQUIPMENT AND METHOD THEREOF, AND BASE STATION AND METHOD THEREOF

(71) Applicant: Sharp Kabushiki Kaisha, Sakai (JP)

(72) Inventors: FangYing Xiao, Shanghai (CN); Renmao Liu, Shanghai (CN); Chao Luo, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 336 days.

(21) Appl. No.: 17/911,165

(22) PCT Filed: Mar. 15, 2021

(86) PCT No.: PCT/CN2021/080742
§ 371 (c)(1),
(2) Date: Sep. 13, 2022

(87) PCT Pub. No.: WO2021/185202
PCT Pub. Date: Sep. 23, 2021

(65) Prior Publication Data
US 2023/0110070 A1    Apr. 13, 2023

(30) Foreign Application Priority Data
Mar. 18, 2020 (CN) .......................... 202010193855.6

(51) Int. Cl.
*H04W 76/20* (2018.01)
*H04W 28/06* (2009.01)

(52) U.S. Cl.
CPC .......... *H04W 76/20* (2018.02); *H04W 28/06* (2013.01)

(58) Field of Classification Search
CPC ............................ H04W 76/20; H04W 28/06
See application file for complete search history.

(56) References Cited

U.S. PATENT DOCUMENTS

| | | | |
|---|---|---|---|
| 11,765,555 B1 * | 9/2023 | Babaei | H04W 80/04 370/312 |
| 2019/0253924 A1 * | 8/2019 | Kim | H04W 28/0273 |

(Continued)

FOREIGN PATENT DOCUMENTS

CN    110856275 A    2/2020

OTHER PUBLICATIONS

Official Communication issued in International Patent Application No. PCT/CN2021/080742, mailed on Jun. 23, 2021.

(Continued)

*Primary Examiner* — Fahmida S Chowdhury
(74) *Attorney, Agent, or Firm* — Keating & Bennett, LLP

(57) ABSTRACT

Provided in the present disclosure are user equipment and a method thereof, and a base station and a method thereof. The method performed by the user equipment includes: receiving a radio resource control (RRC) message from a base station, wherein the RRC message includes information related to an activation configuration of packet data convergence protocol (PDCP) duplication of a radio bearer and/or associated radio link control (RLC) entities; and performing the activation configuration of the PDCP duplication and/or the associated RLC entities on the basis of the information. Thus, the communication efficiency and reliability of a wireless communication system can be improved.

5 Claims, 2 Drawing Sheets

(56) References Cited

U.S. PATENT DOCUMENTS

| | | | |
|---|---|---|---|
| 2019/0253926 A1* | 8/2019 | Kim | H04L 1/08 |
| 2019/0254116 A1* | 8/2019 | Kunt | H04W 80/08 |
| 2020/0162211 A1* | 5/2020 | Wang | H04L 5/0091 |
| 2020/0374752 A1* | 11/2020 | Xiao | H04W 76/15 |
| 2021/0112610 A1* | 4/2021 | Xiao | H04L 1/1614 |
| 2021/0297899 A1* | 9/2021 | Baek | H04L 1/08 |
| 2022/0030616 A1* | 1/2022 | Xiao | H04W 76/15 |
| 2022/0038950 A1* | 2/2022 | Xiao | H04W 76/15 |
| 2022/0131646 A1* | 4/2022 | Pradas | H04L 1/08 |
| 2022/0271866 A1* | 8/2022 | Pradas | H04L 1/08 |
| 2023/0083711 A1* | 3/2023 | Wei | H04L 1/1864 |
| | | | 370/329 |
| 2023/0328817 A1* | 10/2023 | Tsuboi | H04W 76/20 |
| | | | 370/329 |

OTHER PUBLICATIONS

"3rd Generation Partnership Project; Technical Specification Group Radio Access Network; NR; Packet Data Convergence Protocol (PDCP) specification (Release 15)", 3GPP TS 38.323 V15.6.0, Jun. 2019, pp. 1-26.

"3rd Generation Partnership Project; Technical Specification Group Radio Access Network; NR; Radio Link Control (RLC) protocol specification (Release 15)", 3GPP TS 38.322 V15.5.0, Mar. 2019, pp. 1-33.

"3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

Nokia et al., "Revised SID: Study on NR Industrial Internet of Things (IoT)", 3GPP TSG RAN Meeting #81, RP-182090, Sep. 10-13, 2018, 5 pages.

Huawei et al., "Discussion about PDCP duplication activation/deactivation", 3GPP TSG-RAN WG2 Meeting #109 electronic, R2-2001012, Feb. 24-Mar. 6, 2020, 2 pages.

R2 et al., "PDCP Running CR for NR IIOT", 3GPP TSG-RAN WG2 Meeting #109e, R2-2002169, Feb. 24-28, 2020, pp. 1-27.

* cited by examiner

USER EQUIPMENT AND METHOD THEREOF, AND BASE STATION AND METHOD THEREOF

TECHNICAL FIELD

The present disclosure relates to the technical field of wireless communications. More specifically, the present disclosure relates to user equipment and a method thereof, and a base station and a method thereof.

BACKGROUND

In September 2018, at the 3rd Generation Partnership Project (3GPP) RAN #81 plenary meeting, Nokia proposed a research project on the 5G (or NR) industrial Internet of things (IIoT) (see non-patent literature: RP-182090: Revised SID: Study on NR Industrial Internet of Things (IIoT)) and the research project was approved. One of the goals of this research project is to improve the reliability of data transmission and reduce the time delay of data transmission by means of data duplication, specifically including: (1) resource-efficient PDCP duplication, such as avoiding unnecessary duplicate transmissions; and (2) implementing more than two PDCP duplications by using dual connectivity (DC) or carrier aggregation (CA).

In Release 15, a bearer that supports PDCP duplication can be configured with two RLC entities at most. The initial state of the bearer configured with PDCP duplication indicates whether the PDCP duplication function is initially activated by means of a pdcp-Duplication information element (see 3GPP TS 38.331 for a detailed description of the information element). In carrier aggregation, for a bearer in which an initial PDCP duplication function is not activated, data of the bearer is transmitted by means of a logical channel indicated by a primaryPath information element (see 3GPP TS 38.331 for a detailed description of the information element). In dual connectivity, for a bearer in which an initial PDCP duplication function is not activated, whether data is transmitted by means of a logical channel indicated by a primaryPath information element or by using a split bearer is determined according to the amount of data to be transmitted.

In NR IIoT, in order to achieve the goal of two or more PDCP duplications by means of dual connectivity or carrier aggregation, some manufacturers propose to configure a plurality of RLC entities for a bearer that supports PDCP duplication, but only activate a number of RLC entities thereamong each time (that is, a PDCP entity configured with PDCP duplication submits a PDCP PDU to two or more associated and activated RLC entities). The network may indicate by means of RRC signaling or a medium access control control element (MAC CE) whether the PDCP duplication is activated and/or indicate an activated RLC entity. The present disclosure discusses relevant problems involved in configuring and/or activating and deactivating the PDCP duplication and/or the RLC entity.

SUMMARY

In order to solve the above problems in the prior art, provided in the present disclosure are user equipment and a method thereof, and a base station and a method thereof, capable of performing an activation configuration of appropriate PDCP duplication and/or an associated RLC entity on the basis of information related to the activation configuration of the PDCP duplication of a radio bearer and/or the associated RLC entity, thereby improving the communication efficiency and reliability of a wireless communication system.

According to a first aspect of the present disclosure, provided is user equipment, comprising: a receiving unit, configured to receive a radio resource control (RRC) message; and a processing unit, wherein if the RRC message includes an indicator and the indicator indicates that a radio link control (RLC) entity other than a primary RLC entity in RLC entities associated with a data radio bearer (DRB) is activated for packet data convergence protocol (PDCP) duplication, the processing unit considers that the PDCP duplication of the DRB is activated; and if the RRC message does not include the indicator, the processing unit considers that the PDCP duplication of the DRB is deactivated.

According to a second aspect of the present disclosure, provided is a method performed by user equipment, comprising: receiving a radio resource control (RRC) message; and if the RRC message includes an indicator and the indicator indicates that a radio link control (RLC) entity other than a primary RLC entity in RLC entities associated with a data radio bearer (DRB) is activated for packet data convergence protocol (PDCP) duplication, considering that the PDCP duplication of the DRB is activated; and if the RRC message does not include the indicator, considering that the PDCP duplication of the DRB is deactivated.

According to a third aspect of the present disclosure, provided is a base station, comprising: a generation unit, configured to generate a radio resource control (RRC) message, wherein if the RRC message includes an indicator and the indicator indicates that a radio link control (RLC) entity other than a primary RLC entity in RLC entities associated with a data radio bearer (DRB) is activated for packet data convergence protocol (PDCP) duplication, user equipment considers that the PDCP duplication of the DRB is activated; and if the RRC message does not include the indicator, the user equipment considers that the PDCP duplication of the DRB is deactivated; and a transmission unit, configured to transmit the RRC message to the user equipment.

According to a fourth aspect of the present disclosure, provided is a method performed by a base station, comprising: generating a radio resource control (RRC) message, wherein if the RRC message includes an indicator and the indicator indicates that a radio link control (RLC) entity other than a primary RLC entity in RLC entities associated with a data radio bearer (DRB) is activated for packet data convergence protocol (PDCP) duplication, user equipment considers that the PDCP duplication of the DRB is activated; and if the RRC message does not include the indicator, the user equipment considers that the PDCP duplication of the DRB is deactivated; and transmitting the RRC message to the user equipment.

EFFECT OF INVENTION

According to the user equipment and the method thereof and the base station and the method thereof in the present disclosure, an activation configuration of appropriate PDCP duplication and/or an associated RLC entity can be performed on the basis of information related to the activation configuration of the PDCP duplication of a radio bearer and/or the associated RLC entity, thereby improving the communication efficiency and reliability of a wireless communication system.

BRIEF DESCRIPTION OF THE DRAWINGS

The above and other features of the present disclosure will become more apparent with the following detailed description in conjunction with the accompanying drawings.

DETAILED DESCRIPTION

Figure 1:
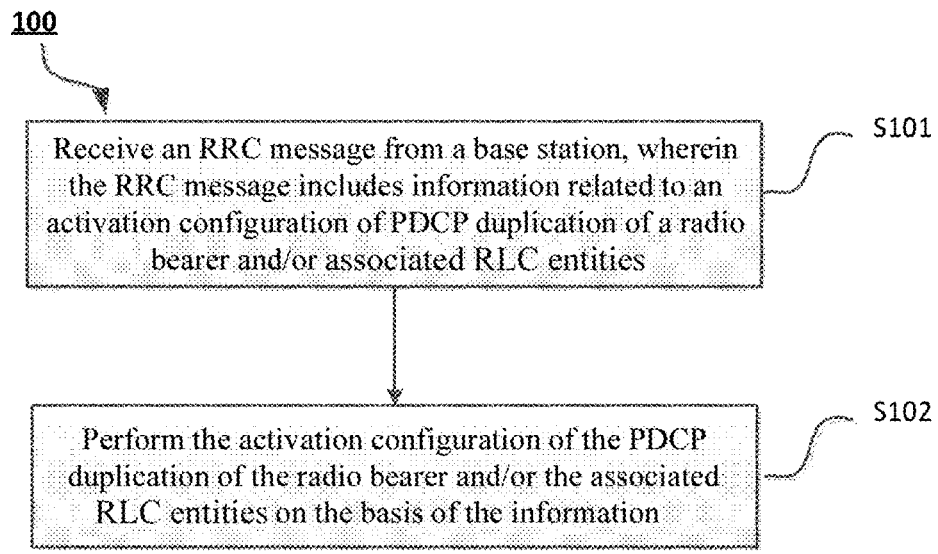
FIG. 1 shows a flowchart of a method 100 applied to user equipment (UE) according to an embodiment of the present disclosure.

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

Some terms related to the present disclosure are described below. Unless otherwise specified, the terms related to the present disclosure use the definitions herein.

RRC: Radio Resource Control.

PDCP: Packet Data Convergence Protocol.

RLC: Radio Link Control. The transmission mode of an RLC entity can be configured as one of a transparent mode (TM), an unacknowledged mode (UM), or an acknowledged mode (AM).

PDU: Protocol Data Unit.

SDU: Service Data Unit.

In the present disclosure, data received from or transmitted to an upper layer is referred to as an SDU, and data transmitted to or received from a lower layer is referred to as a PDU. For example, data received from or transmitted to an upper layer by a PDCP entity is referred to as a PDCP SDU; and data received from a lower layer (namely, an RLC entity) or submitted to the RLC entity by the PDCP entity is referred to as a PDCP PDU (namely, an RLC SDU). The PDCP PDU is a PDCP control PDU or a PDCP data PDU. The currently defined PDCP duplication function only supports PDCP duplication of PDCP data PDUs, so the PDCP duplication described in the present disclosure are all related to PDCP data PDUs.

Non-split bearer: in dual connectivity, wireless protocol is located in an MgNB or SgNB and uses resources of the MgNB or SgNB. A non-split bearer includes a non-split SRB or a non-split DRB.

Split bearer: in dual connectivity, wireless protocol is located in an MgNB and an SgNB and resources of both the MgNB and the SgNB are used. A split bearer includes a split SRB and a split DRB.

PDCP-Config information element: the information element PDCP-Config is used to set configurable PDCP parameters for a signaling radio bearer (SRB) and/or a data radio bearer (DRB).

PDCP duplication: means that the same PDCP PDU is transmitted two or more times, and the PDCP PDU is transmitted by means of RLC entities and/or logical channels associated with different carriers or carrier groups, namely, the same PDCP PDU is submitted to two or more RLC entities of a lower layer. In dual connectivity, the RLC entities and/or logical channels of radio bearers configured with the PDCP duplication belong to (or are respectively associated with) two different MAC entities. When a radio bearer is configured with the PDCP duplication, a secondary RLC entity and a secondary logical channel are added to the radio bearer to process duplicate PDCP PDUs.

For the radio bearer configured with PDCP duplication, if PDCP duplication is activated, a transmitting PDCP entity duplicates the PDCP PDU (the PDCP Data PDU) and submits the PDCP PDU (the PDCP Data PDU) to the associated RLC entities activated for PDCP duplication; otherwise (corresponding to the case where PDCP duplication is not activated), for the non-split bearer, the transmitting PDCP entity submits the PDCP PDU to a primary RLC entity, and for the split bearer, if the split secondary RLC entity is configured and the total amount of PDCP data volume and RLC data volume pending for initial transmission (as specified in TS 38.322[5]) in the primary RLC entity and the split secondary RLC entity is equal to or larger than ul-DataSplitThreshold, then the transmitting PDCP entity submits the PDCP PDU to either the primary RLC entity or the split secondary RLC entity, otherwise, submits the PDCP PDU to the primary RLC entity. The information element (an information element or a parameter for short) ul-DataSplitThreshold is included in the PDCP-Config information element. See 3GPP TS 38.331 for a detailed description of the information element. Specific excerpts are provided as follows:

| ul-DataSplitThreshold |
| --- |
| The parameter is specified in TS 38.323. The value b0 corresponds to 0 bytes, the value b100 corresponds to 100 bytes, the value b200 corresponds to 200 bytes, and so on. For UE that does not support splitDRB-withUL-Both-MCG-SCG, the network sets this field to infinity. If this field is absent when the split bearer is configured for the radio bearer first time, the default value infinity is applied. |

It should be noted that in the present disclosure, if the transmitting PDCP entity of the split bearer is associated with only two RLC entities, it is considered that the split bearer is configured with the split secondary RLC entity, namely, the split secondary RLC entity of the split bearer is the RLC entity (or the secondary RLC entity) different from the primary RLC entity. For the transmitting PDCP entity or radio bearer configured with PDCP duplication that is deactivated, the condition that the split secondary RLC entity is configured may be substituted with the following condition: if the PDCP entity is associated with at least two RLC entities and the RLC entities respectively belong to or are associated with different cell groups (namely, a master cell group (MCG) and a secondary cell group (SCG)).

In the present disclosure, if there are more than two RLC entities associated with the PDCP entity of the radio bearer, the activation of PDCP duplication refers to that there is at least one secondary RLC entity activated for PDCP duplication or at least one RLC entity other than the primary RLC entity activated for PDCP duplication.

Primary path: also referred to as the primary RLC entity configured to transmit the PDCP control PDU and the PDCP data PDU, and the primary path is configured by a parameter primaryPath carried in the RRC message and cannot be deactivated. The primaryPath is used to indicate the cell group ID and LCID of the primary RLC entity.

Secondary path: associated with RLC entities other than the primary path in RLC entities associated with a DRB configured with PDCP duplication.

Split secondary RLC entity: in dual connectivity, an RLC entity, other than the primary RLC entity, configured for split bearer operations.

A method applied to user equipment (UE) in the present disclosure is described below. Specifically, a control method involved in PDCP duplication configured for a radio bearer in the UE is described. As an example, FIG. 1 shows a flowchart of a method 100 applied to user equipment (UE) according to an embodiment of the present disclosure.

In step S101, the user equipment (UE) receives, from a base station, an RRC message (for example, an RRCReconfiguration message), wherein the RRC message includes information related to an activation configuration of PDCP duplication of a radio bearer and/or associated RLC entities, such as a parameter PDCP-Config (or a parameter moreThanTwoRLC).

In step S102, the user equipment (UE) performs the activation configuration of the PDCP duplication of the radio bearer and/or the associated RLC entities on the basis of the information.

In one embodiment, if a parameter duplicationState is absent from the PDCP-Config (or the parameter moreThanTwoRLC included in the PDCP-Config, or the RRC message), at least one of the following operations A-C is performed:

Operation A: the initial PDCP duplication state for all associated RLC entities is activated (applicable to all radio bearers), and/or the PDCP duplication state of the corresponding radio bearer is activated.

Operation B: the initial PDCP duplication state for all associated RLC entities is deactivated (applicable to all radio bearers), and/or the PDCP duplication state of the corresponding radio bearer is deactivated.

Operation C: For the SRB, the initial PDCP duplication state for all associated RLC entities is activated and/or the PDCP duplication state of the corresponding SRB is activated; and for the DRB, the initial PDCP duplication state for all associated RLC entities is deactivated and/or the PDCP duplication state of the corresponding DRB is deactivated.

In one embodiment, the parameter duplicationState is only applied to a DRB, namely, this parameter can be included only when the PDCP duplication is configured for a DRB; and when the SRB supporting the PDCP duplication is configured, the RRC message, the parameter PDCP-Config, or the parameter moreThanTwoRLC does not carry the parameter duplicationState or the UE skips the value of the received duplicationState (in other words, no matter what the value of the parameter duplicationState is, it is always considered that the initial PDCP duplication state for all associated RLC entities is activated).

In one embodiment, for the SRB, if the parameter moreThanTwoRLC is present in the RRC message or the parameter PDCP-Config, the initial PDCP duplication state for all associated RLC entities is activated; and optionally, if the parameter duplicationState is present in the parameter moreThanTwoRLC, the UE skips the value of the parameter duplicationState. In other words, no matter what the value of the parameter duplicationState is, it is always considered that the initial PDCP duplication state for all associated RLC entities is activated.

In one embodiment, when the SRB is configured, if the parameter moreThanTwoRLC is present in the RRC message or the parameter PDCP-Config, the parameter duplicationState must also be or is certainly present in the parameter moreThanTwoRLC. Optionally, the parameter duplicationState indicates that the initial PDCP duplication state for all associated RLC entities is activated.

In one embodiment, for the SRB, if the parameter moreThanTwoRLC is present in the RRC message or the parameter PDCP-Config, it is considered that the initial PDCP duplication state of the SRB is activated.

In one embodiment, when the DRB is configured, if the parameter moreThanTwoRLC is present in the RRC message or the parameter PDCP-Config, the parameter duplicationState must also be present in the parameter moreThanTwoRLC.

The associated RLC entity or all associated RLC entities described in the embodiments of the present disclosure refer to the RLC entity associated with the PDCP entity of the radio bearer or all associated RLC entities (except the primary RLC entity, because the parameter duplicationState is not used to indicate the primary RLC entity and the primary RLC entity cannot be deactivated). The signaling radio bearer (SRB) includes the non-split SRB and the split SRB, the data radio bearer (DRB) includes the non-split DRB and the split DRB, and the radio bearer includes the SRB and the DRB.

In the embodiments of the present disclosure, the initial PDCP duplication state is the initial uplink PDCP duplication state, which refers to the PDCP duplication state for the RLC entity associated when the UE receives the RRC message and configures the corresponding SRB or DRB, the corresponding PDCP duplication state when the corresponding RLC entity is configured, or the PDCP duplication state of the corresponding radio bearer when the corresponding SRB or DRB is configured. The activation of the initial PDCP duplication state for the RLC entity indicates that the PDCP entity submits the PDCP PDU to the RLC entity. The deactivation of the initial PDCP duplication state for the RLC entity indicates that the PDCP entity does not submit the PDCP PDU to the RLC entity.

The parameters involved in the embodiments of the present disclosure are described below.

The parameter duplicationState indicates the initial uplink PDCP duplication state for the associated RLC entities. If the value thereof is set to be true, the initial PDCP duplication state of the associated RLC entities is activated. The index of this indicator (namely, the duplicationState) is determined by ascending order of logical channel identities of all RLC entities other than the primary RLC entity in the order of the master cell group (MCG) and the secondary cell group (SCG). If the duplicationState indicates that the initial PDCP duplication state of at least one associated RLC entity is activated, the initial PDCP duplication state of the corresponding radio bearer is activated; and if the duplicationState indicates that the initial PDCP duplication state of all associated RLC entities is deactivated, the initial PDCP duplication state of the corresponding radio bearer is deactivated.

The parameter moreThanTwoRLC configures UL data transmission when more than two RLC entities are associated with the PDCP entity; and the presence of this parameter indicates that the PDCP duplication is configured or the corresponding radio bearer is configured with the PDCP duplication.

According to the method performed by user equipment, an activation configuration of appropriate PDCP duplication and/or an associated RLC entity can be performed on the basis of information related to the activation configuration of the PDCP duplication of a radio bearer and/or the associated RLC entity, thereby improving the communication efficiency and reliability of a wireless communication system.

Figure 2:
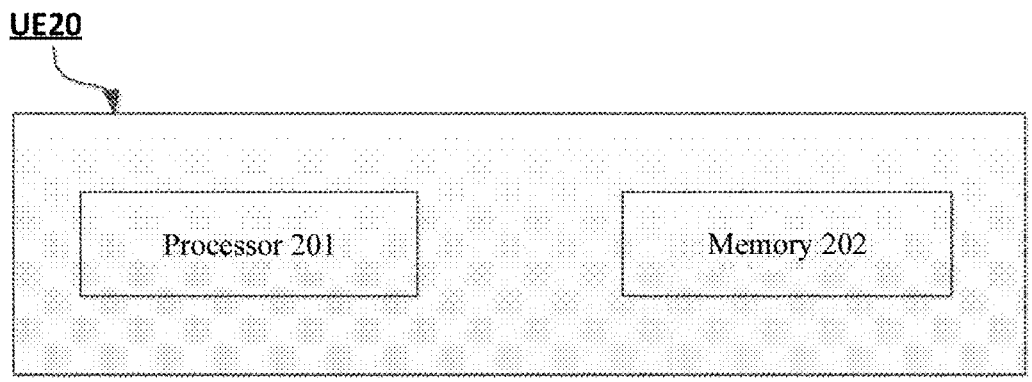
FIG. 2 shows a block diagram of user equipment 20 according to an embodiment of the present disclosure.

In addition, FIG. 2 shows a block diagram of user equipment 20 according to an embodiment of the present disclosure. As shown in FIG. 2, the user equipment 20 includes a processor 201 and a memory 202. The processor 201 may include, for example, a microprocessor, a microcontroller, an embedded processor, and the like. The memory 202 may include, for example, a volatile memory (for example, a random access memory (RAM)), a hard disk drive (HDD), a non-volatile memory (for example, a flash memory), or other memory systems. The memory 202 stores program instructions. The instructions, when run by the processor 201, may execute the method applied to user equipment described in detail in the present disclosure.

Figure 3:
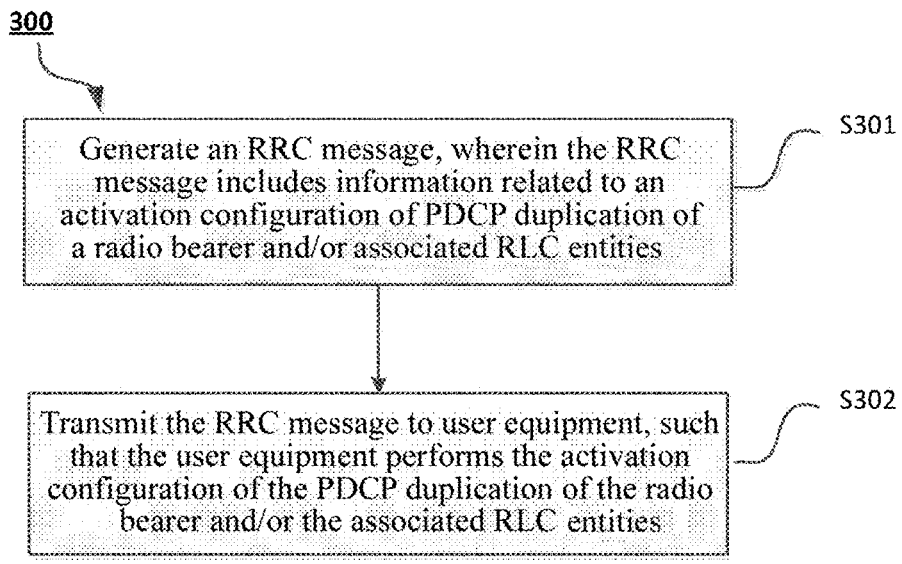
FIG. 3 shows a flowchart of a method 300 applied to a base station according to an embodiment of the present disclosure.

Furthermore, as an example, FIG. 3 shows a flowchart of a method 300 applied to a base station according to an embodiment of the present disclosure. In step S301, an RRC message is generated, wherein the RRC message includes information related to an activation configuration of PDCP duplication of a radio bearer and/or associated RLC entities. In step S302, the RRC message is transmitted to user equipment, such that the user equipment performs the activation configuration of the PDCP duplication of the radio bearer and/or the associated RLC entities on the basis of on the information.

According to the method performed by a base station, an activation configuration of appropriate PDCP duplication and/or an associated RLC entity can be performed on the basis of information transmitted to user equipment and related to the activation configuration of the PDCP duplication of a radio bearer and/or the associated RLC entity, thereby improving the communication efficiency and reliability of a wireless communication system.

Figure 4:
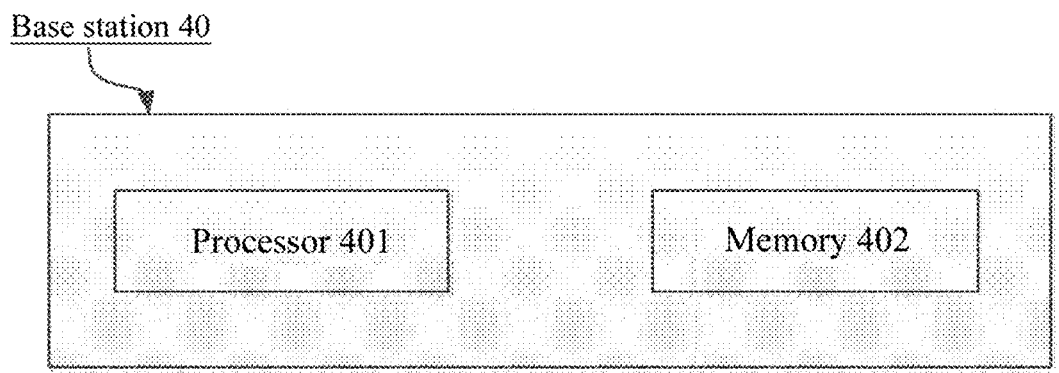
FIG. 4 shows a block diagram of a base station 40 according to an embodiment of the present disclosure.

In addition, FIG. 4 shows a block diagram of a base station 40 according to an embodiment of the present disclosure. As shown in FIG. 4, the base station 40 includes a processor 401 and a memory 402. As mentioned above, the base station 40 in the present disclosure may be any type of base station, including but not limited to: a Node B or an enhanced base station eNB, or may be a base station gNB in a 5G communication system, or a micro base station, a pico base station, a macro base station, a home base station, and the like. The processor 401 may include, for example, a microprocessor, a microcontroller, an embedded processor, and the like. The memory 402 may include, for example, a volatile memory (for example, a random access memory (RAM)), a hard disk drive (HDD), a non-volatile memory (for example, a flash memory), or other memory systems. The memory 402 stores program instructions. The instructions, when run by the processor 401, may execute the method applied to a base station described in detail in the present disclosure.

The computer-executable instructions or program running on the device according to the present disclosure may be a program that enables the computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The computer-executable instructions or program for implementing the functions of the embodiments of the present disclosure may be recorded on a computer-readable storage medium. The corresponding functions may be achieved by reading programs recorded on the recording medium and executing them by the computer system. The phrase "computer system" herein may be a computer system embedded in the device, which may include operating systems or hardware (e.g., peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed by circuits (for example, monolithic or multi-chip integrated circuits). The circuits designed to execute the functions described in the present specification may include a general-purpose processor, a digital signal processor (DSP), an application specific integrated circuit (ASIC), a field programmable gate array (FPGA) or other programmable logic devices, discrete gates or transistor logic, discrete hardware components, or any combination of the above. The general-purpose processor may be a microprocessor, or may be any existing processor, controller, microcontroller, or state machine. The circuits may be digital circuits or analog circuits. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments achieved by appropriately combining the technical means disclosed in the various embodiments are also included within the technical scope of the present disclosure. In addition, components with the same effect described in the above embodiments may be replaced with one another.

The invention claimed is:

1. User equipment (UE), comprising:
   receiving circuitry configured to receive a radio resource control (RRC) message; and
   processing circuitry configured to determine whether packet data convergence protocol (PDCP) duplication of a data radio bearer (DRB) is activated or deactivated based on at least whether the RRC message includes an indication indicating that at least one associated radio link control (RLC) entity other than a primary RLC entity is activated for the PDCP duplication; wherein
   the processing circuitry determines that the PDCP duplication of the DRB is activated in a case that the indication included in the RRC message indicates that at least one associated RLC entity other than the primary RLC entity is activated for the PDCP duplication; and the processing circuitry determines that the PDCP duplication of the DRB is deactivated in a case that the RRC message does not include the indication which indicates that at least one associated RLC entity other than the primary RLC entity is activated for the PDCP duplication.

2. The UE according to claim 1, wherein the indication is only configured for the DRB.

3. A base station, comprising:
   generation circuitry configured to generate a radio resource control (RRC); and
   transmission circuitry configured to transmit the RRC message to user equipment (UE), wherein the UE determines whether packet data convergence protocol (PDCP) duplication of a data radio bearer (DRB) is activated or deactivated based on at least whether the RRC message includes an indication indicating that at least one associated radio link control (RLC) entity other than a primary RLC entity is activated for the PDCP duplication, wherein the UE determines that the PDCP duplication of the DRB is activated in a case that the indication included in the RRC message indicates that at least one associated RLC entity other than the primary RLC entity is activated for the PDCP duplication, and determines that the PDCP duplication of the DRB is deactivated in a case that the RRC message does not include the indication which indicates that at least one associated RLC entity other than the primary RLC entity is activated for the PDCP duplication.

4. The base station according to claim 3, wherein the indication is only configured for the DRB.

5. A method performed by a base station, comprising:
   generating a radio resource control (RRC); and
   transmitting the RRC message to user equipment (UE), wherein the UE determines whether packet data convergence protocol (PDCP) duplication of a data radio bearer (DRB) is activated or deactivated based on at least whether the RRC message includes an indication indicating that at least one associated radio link control (RLC) entity other than a primary RLC entity is activated for the PDCP duplication, wherein the UE determines that the PDCP duplication of the DRB is activated in a case that the indication included in the RRC message indicates that at least one associated RLC entity other than the primary RLC entity is activated for the PDCP duplication, and determines that the PDCP duplication of the DRB is deactivated in a case that the RRC message does not include the indication which indicates that at least one associated RLC entity other than the primary RLC entity is activated for the PDCP duplication.

* * * * *